United States Patent [19]

Vermeulen

[11] Patent Number: 4,932,684

[45] Date of Patent: Jun. 12, 1990

[54] UNIQUE LABEL CONSTRUCTION APPLIED TO A BUSINESS FORM

[75] Inventor: Frederick C. Vermeulen, Coopersburg, Pa.

[73] Assignee: Moore Business Forms, Inc., Grand Island, N.Y.

[21] Appl. No.: 156,589

[22] Filed: Feb. 17, 1988

[51] Int. Cl.$^5$ .......................... B42D 15/00; B41L 1/20; D21H 1/04; C09J 5/04

[52] U.S. Cl. .......................................... 283/81; 282/9 R; 428/40; 156/247

[58] Field of Search .................... 283/81; 282/11.5 A, 282/9 R; 156/157, 204, 247; 40/384, 247, 310, 2 R; 428/40, 41, 42, 43, 194

[56] References Cited

U.S. PATENT DOCUMENTS

| | | | |
|---|---|---|---|
| 3,166,186 | 1/1965 | Karn . | |
| 3,854,229 | 12/1974 | Morgan . | |
| 4,204,706 | 5/1980 | Blum et al. . | |
| 4,219,596 | 8/1980 | Takemoto et al. . | |
| 4,317,852 | 3/1982 | Ogden . | |
| 4,379,573 | 4/1983 | Lomeli et al. . | |
| 4,479,838 | 10/1984 | Dunsirn et al. . | |
| 4,513,039 | 4/1985 | Esmay | 428/40 |
| 4,526,405 | 7/1985 | Hattemer . | |
| 4,528,055 | 7/1985 | Hattemer . | |
| 4,544,590 | 10/1985 | Egan . | |
| 4,554,193 | 11/1985 | Erickson | 428/40 |
| 4,583,765 | 4/1986 | Messinger | 283/81 |
| 4,604,153 | 8/1986 | Meckbye | 428/40 |
| 4,606,956 | 8/1986 | Charbonneau et al. | 428/40 |

*Primary Examiner*—Frank T. Yost
*Assistant Examiner*—Paul M. Heyrana
*Attorney, Agent, or Firm*—Nixon & Vanderhye

[57] ABSTRACT

A label construction and method are provided wherein a label ply and associated adhesive layer are releasably secured to a multi-ply substrate comprising an upper layer with a top surface provided with a release liner and a bottom surface provided with a temporary adhesive. The lower substrate layer has a plain paper top surface and an adhesive bottom surface. The multiple substrate and label ply are releasably mounted to a temporary carrier web or, in later stages of use, to a business form or the like. The user may remove the label and upper substrate ply from the lower substrate ply and carrier web (or form) for later use, with the upper substrate layer providing protection for the adhesive layer on the label ply. When ready for use, the label and upper substrate ply may be separated with the aid of a slit provided in the label adjacent one of its marginal edges.

23 Claims, 1 Drawing Sheet

UNIQUE LABEL CONSTRUCTION APPLIED TO A BUSINESS FORM

BACKGROUND AND SUMMARY OF THE INVENTION

This invention relates generally to pressure sensitive labels and methods for producing such labels, and, more specifically, to the utilization of such labels in combination with business forms.

Pressure sensitive labels presently available usually comprise a sheet of printable paper provided on its lower surface with a suitable primer and a layer of pressure sensitive adhesive. Typically, a liner or backing sheet covers the adhesive to protect it and to prevent the label from inadvertently adhering to surfaces with which it may come into contact prior to its intended use. The liner or backing is generally provided with a with a release coating to facilitate easy removal of the liner. To further facilitate removal of the liner, the liner or label may be split at one or more locations so that upon flexing of the label/liner assembly, a readily accessible label or liner edge is presented for peeling.

A problem arises with such labels when it is desired to remove a pressure sensitive label from one temporary carrier and apply it to another, permanent carrier at some future time. For example, in the business forms trade, business forms are often provided with pressure sensitive labels, such as return address labels, for use by the ultimate recipient of the form. It may be the case, however, for whatever reasons, that the user does not wish to immediately affix the label to another carrier in its ultimately intended use.

Obviously difficulties can arise in such multiple transfers of the pressure sensitive label by reason of repeated exposure of the adhesive layer once the label is removed from its original carrier. Not only can the adhesive layer become contaminated with dust or dirt, thereby losing its adhesive properties, but the label can also become undesirably, and more or less permanently, attached to some other surface.

The present invention overcomes these problems by providing a label construction in which (1) no permanent adhesive surface of the label is exposed at any time before ultimate use of the label; and (2) the label may be removed from one surface, carried around or stored, and later permanently affixed to another surface.

These features have obvious advantages for label constructions used in hospitals, shipping departments, warehouses, mail order houses, and so on.

To this end, the present invention provides a multiply label construction in conjunction, at least initially, with a carrier supply web, and wherein the label construction includes a printable label ply in superposed relationship with multiple substrate plies.

More specifically, in accordance with the present invention, the label construction includes a label ply, which may be a paper or polymer stock, having a printable upper surface and a lower surface provided with a layer or coating of pressure sensitive adhesive. The label ply lies in superposed relationship to a paper substrate which includes an upper and lower layer. The top surface of the upper layer is provided with a release coating, and the bottom or lower surface of the upper layer is provided with a temporary, i.e., single use, adhesive. The substrate lower layer includes a plain paper top surface and a bottom surface provided with a pressure sensitive adhesive layer.

As will be appreciated by those of ordinary skill in the art, an image transfer material of the carbonless self-contained type, for example, may be placed on the upper substrate layer so that an image can be impressed on the upper substrate, through the label ply, via conventional crash printing techniques. Exemplary transfer materials are disclosed in U.S. Pat. Nos. 4,425,386 and 3,663,256. Also, printing could be applied directly to the release layer if, for example, hidden information were required.

The carrier, upon which a plurality of the above described label constructions rest, is provided on its upper surface release coating to facilitate removal of the label construction as desired.

It will thus be appreciated that the label ply is releasably secured to the upper substrate layer, and the latter is temporarily adhered to the lower substrate layer which, in turn, is releasably adhered to the carrier web which itself is provided with a release coating.

The multi-ply substrate arrangement is such that the entire construction may be easily removed from the carrier web and adhesively secured to another temporary carrier, such as a business form or the like. Thereafter, the recipient of the form may use the label in two ways. First, the user may separate the label ply and upper substrate layer along one edge of the label construction. Thus, removed, the label ply, with its adhesive layer covered by the upper substrate layer, may be carried about or stored without damage to the label adhesive layer, and without undesirable sticking. When it is finally decided to use the label, the label ply may be peeled from the upper substrate layer and adhesively secured to the desired surface.

To facilitate removal of the label ply from the upper substrate layer, the label is split, preferably along a marginal edge, opposite the edge by which the upper and lower substrate layers were separated.

In an alternative procedure, the entire label construction may be flexed so that the user can simply peel the label from the upper substrate layer for immediate use.

In a related aspect, this invention involves a method of manufacturing a label construction comprising the steps of:

(a) providing a label ply having a printable top surface and a pressure sensitive adhesive applied to its lower or bottom surface;

(b) providing a substrate comprising upper and lower layers; the upper layer having a release liner or coating applied to its top surface, and a temporary adhesive applied to its lower or bottom surface; the lower layer having a plain top surface and a pressure sensitive adhesive applied to its lower or bottom surface;

(c) releasably adhering the label ply in superposed relationship to the top surface of the upper layer of the substrate; and (d) releasably securing the label and substrate to a temporary carrier.

It will thus be appreciated that the present invention provides a new dimension in the utilization of pressure sensitive labels, eliminating problems associated with prior art labels and providing a great deal of flexibility in the manner in which such labels are used.

Additional objects and advantages will become apparent from the detailed description which follows.

DETAILED DESCRIPTION OF THE DRAWINGS

Figure 1:
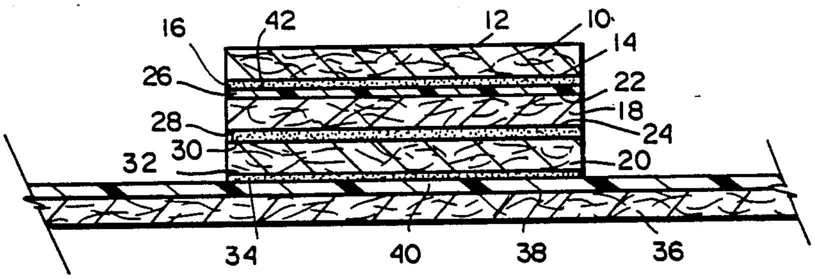
FIG. 1 is side, cross-sectional view of a label construction mounted to a temporary carrier in accordance with this invention.

With reference now to FIG. 1, a paper label 10 which forms a first ply of the multi-ply label construction of this invention, includes a top surface 12 and a lower or bottom surface 14. The latter is provided with a layer of conventional pressure sensitive adhesive 16. The label ply 10 lies in superposed relationship to a multi-ply substrate comprising an upper substrate layer 18 and a lower substrate layer 20. The upper substrate layer 18 has a top surface 22 and an bottom surface 24, wherein the top surface 22 is provided with a conventional release coating 26 and the bottom surface 24 is provided with a layer of temporary, i.e., single use, adhesive 28 of any suitable type.

The lower substrate layer 20 includes a plain top surface 30, while a bottom surface 32 is provided with a pressure sensitive adhesive 34, similar to that applied to the lower surface of the label 10. The entire label construction comprising the label ply 10 and substrate layers 18 and 20 are releasably secured to a temporary carrier 36 provided on an upper surface 38 with a release coating or binder 40.

The label ply 10 is also preferably provided with a split 42 which extends along one marginal edge of the ply, and which facilitates removal of the label ply 10 from the upper substrate layer 18, particularly upon flexing of the assembly.

Figure 2:
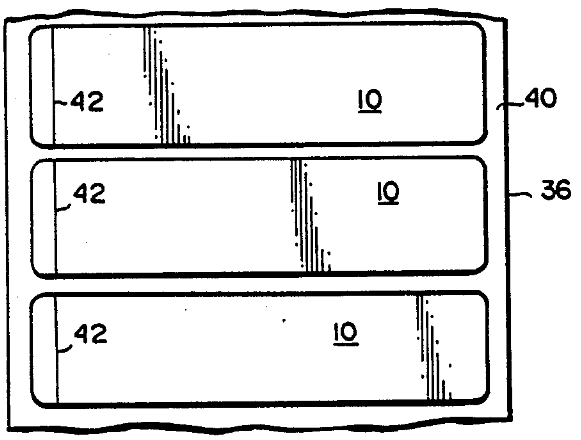
FIG. 2 is a partial, top view illustrating a plurality of mounted on a temporary carrier in accordance with the invention.

FIG. 2 illustrates a plurality of generally rectangularly shaped labels 10 mounted on a temporary, elongated carrier web 36. It will be understood that are manufactured in this form and, typically, wound into supply rolls for shipment.

Figure 3:
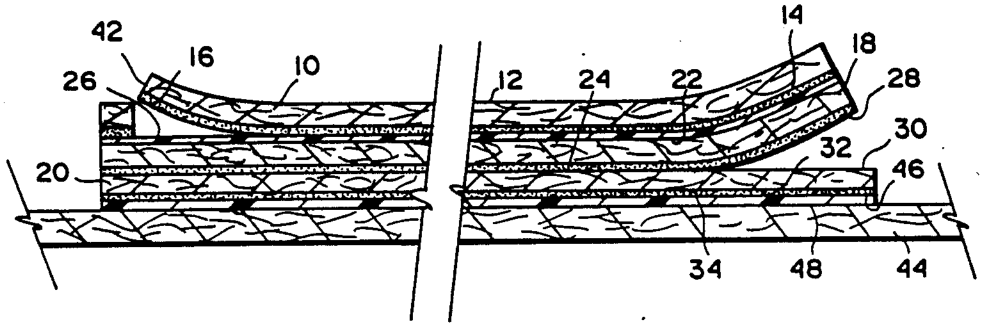
FIG. 3 is a side, cross-sectional view of a label construction mounted on a business form in accordance with this invention and illustrating alternative manners of use for the subject label.

In FIG. 3, a label construction identical in all respects to that illustrated in FIG. 1 is shown applied to a business form 44 provided with a release liner or coating 46, preferably only on that part of its upper surface 48 which underlies the label construction. The business form 44 is shown for illustrative purposes, only it being understood that the label construction may be applied to numerous carriers in various of the industries noted herein above.

FIG. 3 also illustrates the alternative procedures for using the label in accordance with the present invention. On the right side of FIG. 3, a first procedure is illustrated wherein the user may remove the label ply 10 along with the upper substrate layer 18 by peeling them away from the right-hand side of the lower substrate layer 20. In this configuration, the removed label may be stored, placed in one's pocket, or otherwise carried about from place to place with no possibility of damaging or diminishing the adhesive properties of the pressure sensitive label 10. At whatever time thereafter that the label ply 10 is to be ultimately used, the user simply flexes the combined label ply 10 and upper substrate layer 20 so that the label ply 10 separates from the upper substrate layer, enabling the user to peel off the pressure sensitive label as illustrated on the left hand side of FIG. 3, and to apply it to the desired surface.

In an alternative manner of use, the user may simply flex and peel the pressure sensitive label 10 from the upper and lower substrate layers for immediate use, without having first separated the upper and lower substrate plies 18 and 20.

Thus, the invention provides a label construction characterized by simplicity and flexibility of use, heretofore unattainable with prior art label constructions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. In combination with a business form, a removable label construction comprising:
   - a label provided with upper and lower surfaces, said lower surface provided with an adhesive;
   - a multi-layer substrate supporting said label and removably mounting said label on the business form, said substrate including means permitting removal of said label from the business form in a first mode wherein said adhesive on said lower label surface is not exposed, and in a second mode wherein said adhesive on said lower label surface is exposed.

2. The combination of claim 1 wherein said multi-layer substrate comprises first and second paper layers and wherein, in said first mode, said lower label surface is covered by said first paper layer, said first paper layer having an upper surface provided with a release coating.

3. The combination of claim 2 wherein said first paper layer has a bottom surface provided with a temporary adhesive in releasable engagement with an upper surface of said second paper layer.

4. The combination of claim 3 wherein said second layer has a bottom surface provided with a relatively permanent adhesive, said second layer bottom surface in adhesive engagement with said business form.

5. The combination of claim 1 wherein said means includes a tear line located inwardly of one edge of said label for facilitating removal of said label in said second mode.

6. The combination of claim 3 wherein, in said first mode, said first and second paper layers are separated.

7. A label construction comprising:
   - paper substrate means including upper and lower superposed paper layers separated by a first adhesive;
   - a label having upper and lower surfaces, said lower surface provided with a second adhesive; wherein said label is superposed over said upper paper layer and wherein said label and said upper paper layer are separated by a release coating.

8. A label construction as defined in claim 7 wherein said label is formed with a tear line adjacent a first edge of said label to thereby facilitate removal of said label from said upper paper layer.

9. A label construction as defined in claim 8 wherein said upper and lower paper layers are separable along a second edge, laterally opposite said first edge.

10. A label construction as defined in claim 8 wherein said upper paper layer and said label are together separable from said lower paper layer.

11. A label construction as defined in claim 7 in combination with temporary carrier means, said lower paper layer being provided on a lower surface with a third adhesive and said carrier having an upper surface provided with a release coating.

12. A label supply comprising:

an elongated carrier web of predetermined width and indeterminate length, said web provided with a release liner;

a plurality of multi-ply label constructions releasably mounted along the length of said web, each of said label constructions comprising:

a label ply having upper and lower surfaces, said lower surface provided with a layer of pressure sensitive adhesive; and multiple, superposed substrate plies arranged between said label ply and said carrier web, said substrate plies including means permitting removal of said label ply from said carrier web in a first mode wherein said pressure sensitive adhesive is covered.

13. A label supply as defined in claim 12 wherein said multiple substrate plies include an upper substrate ply having an upper surface provided with a release liner, and a lower substrate ply having a lower surface provided with a layer of pressure sensitive adhesive.

14. A label supply as defined in claim 13 wherein said upper substrate play has a lower surface provided with a layer of temporary adhesive adapted to temporarily join said upper substrate ply to said lower substrate ply.

15. A label supply as defined in claim 14 wherein, in said first mode, said upper and lower substrate plies are separated and said upper substrate ply is releasably connected to said label ply.

16. A label supply as defined in claim 15 and wherein, in said first mode, said upper substrate ply may thereafter be removed from said label ply, exposing the pressure sensitive adhesive of said label ply.

17. A label supply as defined in claim 12 wherein said substrate plies include means permitting removal of said label ply from said carrier web in a second mode wherein said pressure sensitive adhesive on the lower surface of said label ply is exposed.

18. A method of making a pressure sensitive label construction for a business form comprising the steps of (a) providing a label ply having a printable top surface and a pressure sensitive adhesive applied to its lower or bottom surface;

(b) providing a substrate comprising upper and lower layers; the upper layer having a release liner or coating applied to its top surface, and a temporary adhesive applied to its bottom surface; the lower layer having a plain top surface and a pressure sensitive adhesive applied to its bottom surface;

(c) releasably adhering said label ply in superposed relationship to the top surface of the upper layer of the substrate; and (d) releasably securing said label ply and substrate to a temporary carrier.

19. A method as defined in claim 18 wherein said label ply is substantially rectangular.

20. A method as defined in claim 18 wherein at least said upper and lower substrate layers comprise paper.

21. A method as defined in claim 18 wherein, step (d) further comprises securing a plurality of label constructions to said temporary carrier.

22. A method as defined in claim 21 wherein, subsequent to step (d), at least one of said label constructions is removed from said temporary carrier and applied to a business form, whereby said label play and said upper substrate layer may be removed from said form in a first mode wherein said label ply is covered by said upper substrate layer, or in a second mode wherein said pressure sensitive adhesive on the bottom surface of said label ply is exposed.

23. A method as defined in claim 22 wherein said label ply and said upper substrate layer are first removed from said form first removed in said first mode, and thereafter said label ply is peeled from said upper substrate layer for reuse.

* * * * *